(No Model.) 2 Sheets—Sheet 1.

P. HENSELER.
SLED ATTACHMENT FOR WAGONS.

No. 581,989. Patented May 4, 1897.

WITNESSES:
George L. Jaekel
O. Gast.

INVENTOR
Peter Henseler
BY
Goepel & Raegener
ATTORNEYS.

(No Model.) 2 Sheets—Sheet 2.

P. HENSELER.
SLED ATTACHMENT FOR WAGONS.

No. 581,989. Patented May 4, 1897.

WITNESSES:
INVENTOR
Peter Henseler
BY
ATTORNEYS.

UNITED STATES PATENT OFFICE.

PETER HENSELER, OF UNION HILL, NEW JERSEY.

SLED ATTACHMENT FOR WAGONS.

SPECIFICATION forming part of Letters Patent No. 581,989, dated May 4, 1897.

Application filed September 11, 1896. Serial No. 605,488. (No model.)

*To all whom it may concern:*

Be it known that I, PETER HENSELER, a citizen of the United States, residing at Union Hill, (Weehawken P. O.,) in the county of Hudson and State of New Jersey, have invented certain new and useful Improvements in Sled Attachments for Wagons, of which the following is a specification.

This invention has reference to an improved sled attachment for vehicles of all kinds, which attachment is applied to the axles and provided with independent runners for each wheel, said runners being supported parallel with the axles when not required for use and placed below the wheels and locked thereto when the wagon is to be used as a sled; and the invention consists of a sled attachment for vehicles, which comprises a transverse supporting-bar attached to each axle by means of fastening-clips, short runner-supporting pieces hinged to each end of the transverse bar, U-shaped runners suspended by pivot-links from the hinged pieces, and means for locking the runners into position below the wheels.

The invention consists, further, of certain details of construction and combination of parts which will be fully described hereinafter and finally pointed out in the claims.

Figure 1:
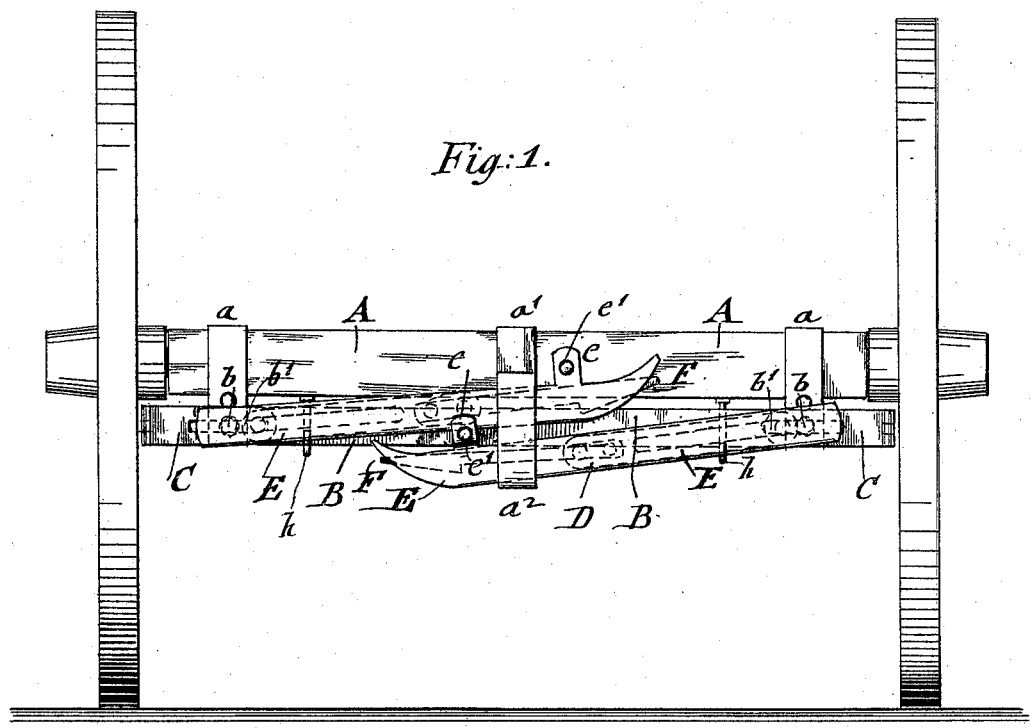
Figure 2:
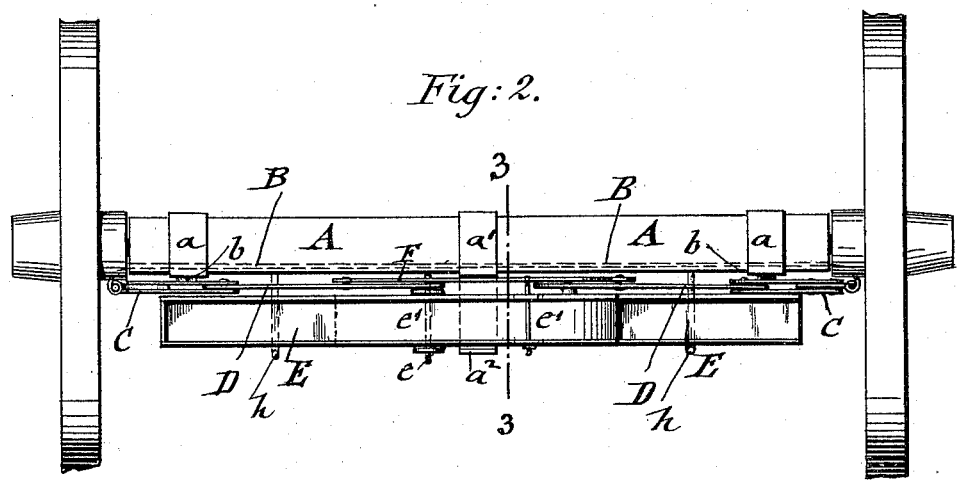
Figure 3:
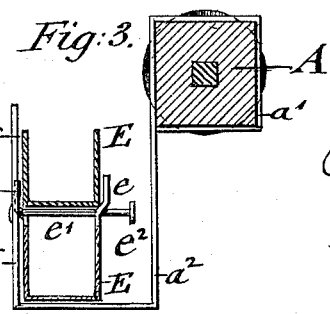
Figure 4:
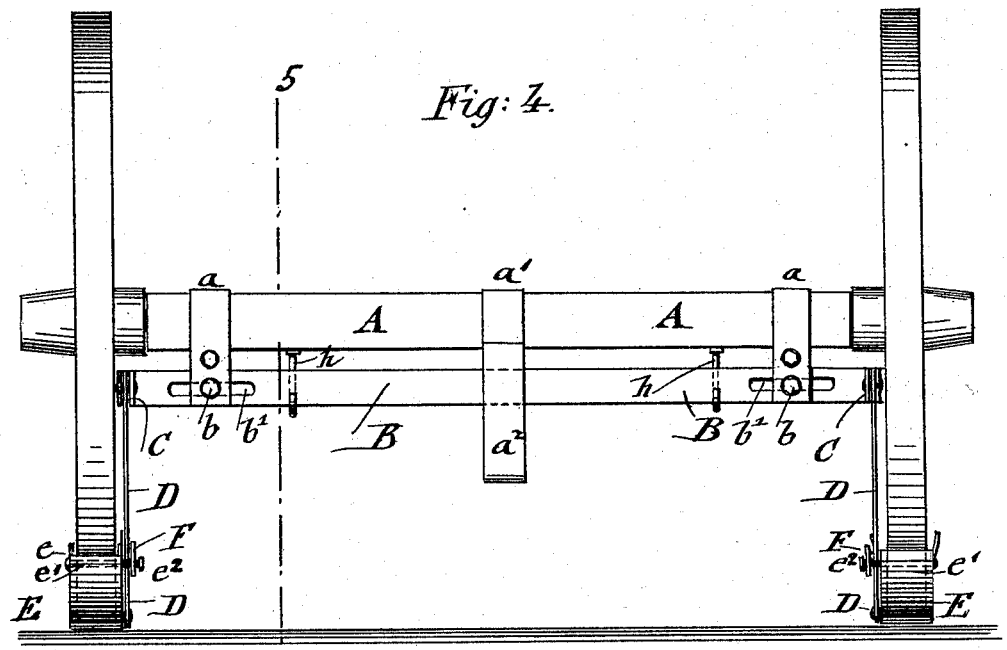
Figure 5:
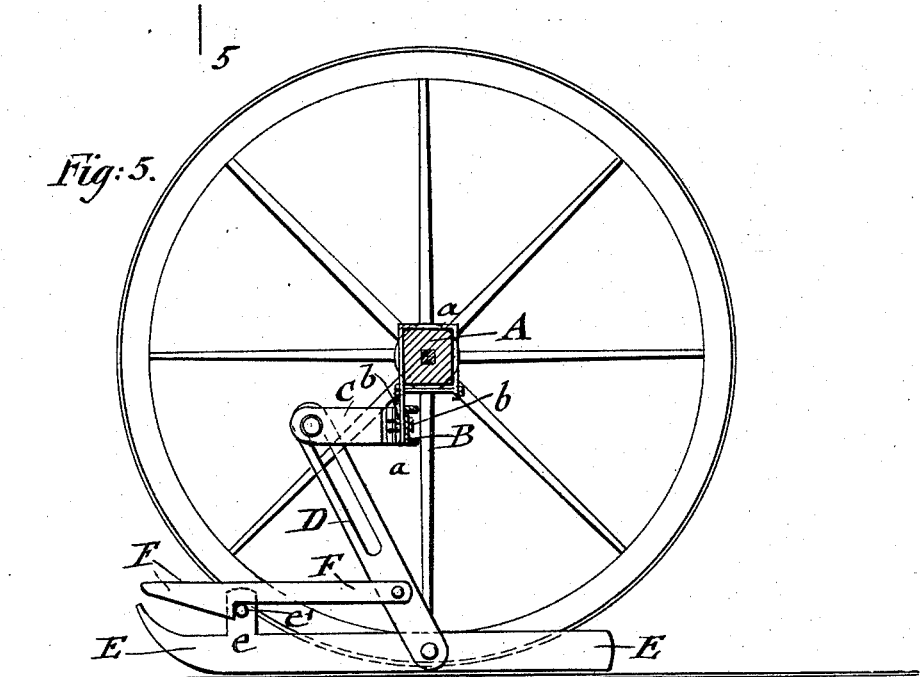

In the accompanying drawings, Figure 1 represents a front elevation of a wagon-axle with my improved sled attachment shown supported from the axle and in its normal position of rest. Fig. 2 is a plan view of Fig. 1. Fig. 3 is a vertical transverse section on line 3 3, Fig. 2, drawn on a larger scale. Fig. 4 is also a front elevation of one of the axles, showing the sled attachment in position below the wheels and locked thereto; and Fig. 5 is a vertical transverse section on line 5 5, Fig. 4.

Similar letters of reference indicate corresponding parts.

Referring to the drawings, A represents one of the axles of a suitable vehicle, from which axle is suspended, by means of clips $a$ $a$, a transverse bar B, which is made of channel-iron and attached to the clips $a$ $a$ by means of clamping-bolts $b$. The bar B is adjustable on the clips $a$ $a$ by horizontal slots $b'$, so as to permit a certain play on the clips of the axle. To each end of the transverse supporting-bar B is hinged a short piece C, which is adapted to be folded over the transverse bar B and to the outer end of which is pivoted a slotted link D, to the lower end of which is pivoted a U-shaped runner E, of malleable iron, sheet-steel, or other suitable material, as shown clearly in Fig. 5. The runners E are curved in upward direction at their front ends and provided with lugs $e$, connected by transverse pins $e'$, the headed inner ends $e^2$ of which are engaged by hooks F, that are pivoted to the links D when placed in engagement with the pins $e'$.

When it is desired to apply the runners to the wheels, the hinged pieces C are moved, with the runners, in forward direction into a position at right angles to the supporting-bar B, after which the pivot-links and runners are lowered and the latter placed below the wheels in such a manner that the tires abut against the transverse pins $e'$. The pivot-hooks F are then placed over the headed ends of the pins $e'$, as shown in Fig. 5, and locked rigidly to the wheels and retained in position during the forward or backward motion of the vehicle owing to the locking connection formed by the pivot-hooks, the slotted links, and the pins on the runners. The pivoted connecting-links D between the hinged pieces C and the runners are slotted at their upper ends, so as to permit the inward folding of the runners into a position parallel with the supporting-bar B until they are supported on a central hanger $a^2$, which is attached by a center clip $a'$ to the pole and side hangers $h$, as shown in Fig. 1. In this position the sled attachment of each pair of wheels is supported in front of and parallel with the axle, so as to be ready for being applied to the wheels whenever the vehicle is to be used as a sled.

During the summer the sled attachment may be removed from the axles by loosening the clamping-screws by which the transverse supporting-bar B is connected with the clips $a$ $a$, it being then stored in folded condition with the hinged pieces C, links D, runners E, and locking-hooks F. The clips $a$ $a'$ remain in position on the axles, so that the sled attachment can be readily applied thereto when it is required for use in the winter season.

The advantages of my improved sled attachments for vehicles are:

First. The attachment can be applied to the axles and supported parallel thereto without interfering with the regular working of the wagon.

Second. The sled attachment can be readily moved from its normal position of rest and the runners placed below the wheels and locked thereto.

Third. The sled attachment can be supplied at a comparatively small expense, as all the parts are constructed of wrought-iron, malleable iron, or steel, whereby great durability, together with strength, is obtained.

Having thus described my invention, I claim as new and desire to secure by Letters Patent—

1. The combination, with the axle of a vehicle, of a transverse supporting-bar arranged parallel with the axle, hinged pieces applied to the ends of said supporting-bar, U-shaped runners, pivot-links connecting the said hinged pieces with the runners, and means for locking the runners to the wheels, substantially as set forth.

2. The combination, with the axle of a vehicle, of a transverse supporting-bar arranged parallel with the axle, hinged pieces applied to the ends of said bar, U-shaped runners, pivot-links between the hinged pieces and the runners, means for supporting the runners and intermediate pieces in a position parallel with the axle, and means for locking the runners to the wheels at right angles to the axles, substantially as set forth.

3. The combination, with the axle of a vehicle having clips, of a transverse supporting-bar attached to said clips, a central hanger applied to the axle, folding pieces hinged to the ends of the supporting-bar, runners adapted to be applied to the wheels and provided with headed transverse pins, pivot-links connecting the folding pieces with the runners, and locking-hooks connecting the pivot-links with the transverse pins of the runners, substantially as set forth.

In testimony that I claim the foregoing as my invention I have signed my name in presence of two subscribing witnesses.

PETER HENSELER.

Witnesses:
 PAUL GOEPEL,
 GEO. W. JAEKEL.